UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD OF OBTAINING TITANIC OXID.

1,348,843. Specification of Letters Patent. Patented Aug. 10, 1920.

No Drawing. Application filed February 27, 1919. Serial No. 279,614.

*To all whom it may concern:*

Be it known that I, LOUIS E. BARTON, a citizen of the United States, and a resident of Niagara Falls, county of Niagara, and State of New York, have invented certain new and useful Improvements in Methods of Obtaining Titanic Oxid, of which the following is a specification.

My present invention relates to the obtaining of titanic oxid concentrates from titaniferous and ferruginous substances, such, for example, as ilmenite ores, and more particularly to such methods for so doing as are disclosed in Letters Patent granted to Auguste J. Rossi and myself, Nos. 1,106,409 and 1,106,410, dated August 11th, 1914, No. 1,171,542, dated February 15, 1916, and Nos. 1,206,796 and 1,206,798, dated December 5, 1916, granted to me.

The objects of my present invention comprise provision of novel steps in the practice of such, or similar, methods whereby their final products are attainable more safely and economically than heretofore.

Reference to the said Letters Patent will disclose the methods, processes, and products therein described and claimed, which may, for the purposes of this specification, be summarized as follows, viz: The titaniferous-ferruginous substances treated, such, for example, as ordinary titaniferous, or ilmenite, ores, were melted in the presence of sulfid of an alkali metal, either charged as such, or produced by reactions in the charge, during its melting, from therewith-mixed carbonaceous material and sulfate of an alkali metal. The resulting melts, containing titanate of the alkali metal and sulfids of iron, such as ferrous sulfid or ferro sodium sulfid, were then preferably after, or without, lixiviation with water, heated in a bath containing sulfuric or hydrochloric, or other for the purpose utilizable, acid so dilute as to dissolve the therein iron, and other compounds, rather than those of titanium; and, finally the insoluble residues being withdrawn, were washed, dried, and if desired, calcined, the resulting, usually powdered, products being prior to calcination, darkish to light gray in color, or, if calcined, yellowish, and distinguished, by analysis, as consisting principally of titanic oxid, the percentage of which was somewhat increased by calcination, and as containing also some soda and sulfuric anhydrid, and a relatively small quantity of iron oxid; one of the most notable and useful distinguishing characteristics of said products being the exceptional ease, rapidity, and completeness with which they are soluble in concentrated sulfuric, or other, acid.

When the sulfids produced in the melts of said patented processes are treated as aforesaid with acid, a chemical equivalent of hydrogen sulfid gas is evolved. For example, with iron sulfid, we have:

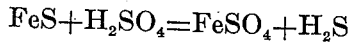

$$FeS + H_2SO_4 = FeSO_4 + H_2S$$

The well known character and undesirable effects of hydrogen sulfid thus produced have indicated the desirability of remedying this detriment to the operation of the methods referred to.

To this end, I have hitherto invented the expedients described and claimed in Letters Patent granted to me, Nos. 1,201,541, dated October 17, 1916, and 1,206,797, dated December 5, 1916.

My present invention is based on my present discovery that my said last referred to expedients can be advantageously dispensed with if, during the operation of the above referred to concentration processes, *i. e.* before the solution in the dilute acid bath, the sulfids of the melt, are converted into forms, which will, in the bath, no longer give rise to hydrogen sulfid gas, *i. e.* into oxygenated compounds, such, for example, as sulfates, or sulfites, or both, and that this is feasible with practical industrial economy and efficiency by aid of, under the existing conditions, such means, manipulations and treatments as I have devised for this purpose, as hereinafter described.

I have discovered that aside from other comparatively unsatisfactory expedients for the purpose, the most practical, economical, and efficient methods of attaining the desired reactions and resulting oxidation under the special conditions of the concentration processes in question, involve, generally speaking, the following features, viz: The solidified melts should be comminuted, or crushed, to preferably no larger than about ¼ inch size; the resulting multiplied surfaces of the melt should be wetted, and preferably maintained wet, for example by spraying with water, and the thus wetted surfaces should be as universally, and equally, as may be, subjected to contact with an oxygen-containing gas, for example air, and preferably in such fashion, e. g. by agitations of the charge, or by imparting movements to the gas, or by both, as to insure motion of the one relatively to the other, and furthermore, during its said treatment, the charge should be subjected to temperatures above normal.

My present invention is, for example, worked as follows: A solidified melt, or material, such as obtainable by the methods of the patents referred to in the second paragraph of this specification, and comprising iron-containing sulfids, such as ferrous sulfid or ferro-sodium sulfid, or both, I withdraw from the furnace and comminute it in any preferred well-known manner as by crushing, grinding, etc., down to not larger than about $\frac{1}{4}$ inch, or preferably, to about $\frac{1}{16}$ inch, or even smaller. I then wet the thus comminuted material with from 10 to 25 per cent. of its weight of water. I then, during occurrence of the desired reactions, keep the wetted material exposed to an oxygen-containing gas, preferably air, in any convenient container, preferably one comprising means whereby the above mentioned motion of the charge and the therewith contacting gas, or air, relatively to each other, is attainable.

Such containers, so equipped, I believe to be too well-known in other arts to require, for understanding of my invention, further illustration, or description here.

One familiar type consists essentially of a slowly revolving barrel, intermittently chargeable and dischargeable, and into which, through trunnions thereof, are projectable, or transmittable, during rotation, such fluid, or fluids, as it is desired to apply to the treatment of the charge.

In such barrel I tumble the comminuted and wetted material, meanwhile passing a current of the gas into transient contact therewith through the usual inlets or outlets in the trunnions, and through which I can, if indicated, also inject water sufficiently to keep the surface of the material wetted. Or I spread the material in relatively thin layers upon trays contained in a chamber, through which I cause the current of gas to pass continuously in contact with the thus exposed comminutions, which are likewise further wetted as by spraying, if indicated.

Or I feed the material continuously into one end of a slowly revolving tube, or cylinder, of the well-known kiln drier type, through which it is, by aid of rotation and gravity, slowly tumbled, and caused to progress, until it is discharged from the opposite end, meanwhile injecting into the tube the gas, or the water, or both, as may be indicated in aid of the operation of my invention as above described.

During the operation I supply heat to the materials and media at about 60° C., or higher, it being, generally speaking, desirable that there be maintained within the charge a temperature of about 90° C., or even somewhat greater. Need of the additional moistenings of the surface is usually indicated whenever the temperatures become, as they may, under certain conditions, so high as to result in loss, by evaporation, etc., of too much of the water initially employed, and I prefer, in such cases, to use water in the form of spray, or sometimes vapor or steam.

The desired conversion of the sulfids of the melt having been accomplished as above described, the product is thereafter further treated as per the methods of the above referred to patents, i. e. it is subjected to the action of an acid bath, the acid of which, preferably sulfuric, or hydrochloric, is so dilute as to dissolve therein compounds of iron rather than those of titanium. The resulting titanic residues are then separated, as by filtration, and, if desired, calcined, thereby obtaining the tianic oxid concentrate products aimed at by the patented processes above referred to.

Having now described my invention, what I claim as new and desire to secure by Letters Patent is the following, viz:

1. In obtaining titanic oxid concentrates by aid of acid treatment of material comprising both compounds of titanium and also sulfids containing iron, the step which consists in, prior to such acid treatment, converting such sulfids into oxygenated compounds.

2. In obtaining titanic oxid concentrates by aid of acid treatment of material comprising both compounds of titanium and also sulfids containing iron, the step which consists in, prior to such acid treatment, oxidizing such sulfids to sulfates or sulfites.

3. The method of obtaining titanic oxid from titaniferous-ferruginous material, which comprises heating said material in presence of sulfid of an alkali metal to formation of sulfids containing iron; next converting such last mentioned sulfids in the resulting product into oxygenated compounds of sulfur and iron; and thereafter subjecting the thus modified product to the action of an acid solvent of the last mentioned compounds of iron and sulfur but so diluted as to dissolve them rather than therewith associated compounds of titanium.

4. The method of obtaining titanic oxid from titaniferous-ferruginous material, which comprises heating said material in presence of sulfid of an alkali metal to formation of sulfids containing iron; applying water to the resulting product and subjecting it to the action of an oxygen-containing gas until said sulfids are converted into sulfates or sulfites; and thereafter subjecting the thus modified product to the action of an acid solvent of the last mentioned compounds of iron and sulfur but so diluted as to dissolve them rather than therewith associated compounds of titanium.

5. The method of obtaining titanic oxid from titaniferous-ferruginous material, which comprises heating said material in presence of sulfid of an alkali metal to formation of sulfids containing iron; applying water to the resulting product and subjecting it to the action of an oxygen-containing gas heated above normal until said sulfids are converted into sulfates or sulfites; and thereafter subjecting the thus modified product to the action of an acid solvent of the last mentioned compounds of iron and sulfur but so diluted as to dissolve them rather than therewith associated compounds of titanium.

6. The method of obtaining titanic oxid from titaniferous-ferruginous material, which comprises heating said material in presence of sulfid of an alkali metal to formation of sulfids containing iron; comminuting, and applying water to, the resulting product and subjecting it to the action of an oxygen-containing gas until said sulfids are converted into sulfates or sulfites; and thereafter subjecting the thus modified product to the action of an acid solvent of the last mentioned compounds of iron and sulfur but so diluted as to dissolve them rather than therewith associated compounds of titanium.

7. The method of obtaining titanic oxid from titaniferous-ferruginous material, which comprises heating said material in presence of sulfid of an alkali metal to formation of sulfids containing iron; comminuting, and applying water to, the resulting product, agitating it, and meanwhile subjecting it to the action of an oxygen-containing gas until said sulfids are converted into sulfates or sulfites; and thereafter subjecting the thus modified product to the action of an acid solvent of the last mentioned compounds or iron and sulfur but so diluted as to dissolve them rather than therewith associated compounds of titanium.

LOUIS E. BARTON.

Witnesses:
ROBERT P. EASTON,
MATTHEW C. HAYES.